(12) United States Patent
West et al.

(10) Patent No.: US 7,529,435 B2
(45) Date of Patent: May 5, 2009

(54) SERIAL ROUTING OF OPTICAL SIGNALS

(75) Inventors: Lawrence C. West, San Jose, CA (US); Dan Mayden, Los Altos Hills, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 10/856,120

(22) Filed: May 28, 2004

(65) Prior Publication Data

US 2005/0053383 A1 Mar. 10, 2005

Related U.S. Application Data

(60) Provisional application No. 60/474,164, filed on May 29, 2003.

(51) Int. Cl.
*G02B 6/12* (2006.01)
*H04B 10/00* (2006.01)

(52) U.S. Cl. .......................................... 385/14; 398/153
(58) Field of Classification Search .................... 385/24, 385/129, 48; 398/153
See application file for complete search history.

(56) References Cited

U.S. PATENT DOCUMENTS

| | | | |
|---|---|---|---|
| 3,217,856 A | 11/1965 | Miles | |
| 4,006,432 A | 2/1977 | Streifer et al. | |
| 4,100,562 A | 7/1978 | Sugawara et al. | |
| 4,368,481 A | 1/1983 | Ohashi et al. | |
| 4,438,447 A | 3/1984 | Copeland, III et al. | |
| 4,720,468 A | 1/1988 | Menigaux et al. | |
| 4,734,910 A | 3/1988 | Izadpanah | |
| 4,759,023 A | 7/1988 | Yamaguchi | |
| 4,959,540 A | 9/1990 | Fan et al. | |
| 4,980,568 A | 12/1990 | Merrick et al. | |
| 5,109,446 A * | 4/1992 | Kaltschmidt | 385/24 |
| 5,179,604 A * | 1/1993 | Yanagawa et al. | 385/24 |
| 5,190,883 A | 3/1993 | Menigaux et al. | |
| 5,193,131 A | 3/1993 | Bruno | |
| 5,291,010 A | 3/1994 | Tsuji | |
| 5,298,787 A | 3/1994 | Bozler et al. | |
| 5,345,557 A | 9/1994 | Wendt | |

(Continued)

FOREIGN PATENT DOCUMENTS

| | | |
|---|---|---|
| EP | 0 661 561 A2 | 7/1995 |
| EP | 0 661 561 A3 | 7/1995 |
| JP | 07 335855 A | 12/1995 |
| WO | WO-03/036369 A1 | 5/2003 |

OTHER PUBLICATIONS

Chen et al. "Fully Embedded Board-Level Guided-Wave Optoelectronic Interconnects" Proceedings of the IEEE. Jun. 2000, pp. 780-793, vol. 88(6).

Choi et al. "Self-Aligning Silicon Groove Technology Platform for the Low Cost Optical Module" 1999 Electronic Components and Technology Conference, IEEE. 1999, pp. 1140-1144.

Irace et al. "Fast Silicon-on-Silicon Optoelectronic Router Based on a BMFET Device" IEEE Journal of Selected Topics in Quantum Electronics. Jan./Feb. 2000, pp. 14-18, vol. 6(1).

(Continued)

*Primary Examiner*—Michelle R Connelly Cushwa
(74) *Attorney, Agent, or Firm*—Eric L. Prahl

(57) ABSTRACT

An optical signal distribution network including a semiconductor substrate including a waveguide formed therein to carry an optical signal; and a plurality of detectors within the waveguide and serially arranged along its length, each of the detectors being capable of detecting the optical signal passing through it and sufficiently transparent to the optical signal to enable the optical signal to reach and be detected by all of the plurality of detectors.

19 Claims, 6 Drawing Sheets

U.S. PATENT DOCUMENTS

| | | | |
|---|---|---|---|
| 5,357,122 | A | 10/1994 | Okubora et al. |
| 5,382,810 | A | 1/1995 | Isaksson |
| 5,463,229 | A | 10/1995 | Takase et al. |
| 5,481,515 | A | 1/1996 | Kando et al. |
| 5,523,557 | A | 6/1996 | Bruno |
| 5,536,974 | A | 7/1996 | Nishiguchi |
| 5,548,433 | A | 8/1996 | Smith |
| 5,569,934 | A | 10/1996 | Fujii et al. |
| 5,604,361 | A | 2/1997 | Isaksson |
| 5,633,527 | A | 5/1997 | Lear |
| 5,663,592 | A | 9/1997 | Miyazawa et al. |
| 5,728,605 | A | 3/1998 | Mizutani |
| 5,767,508 | A | 6/1998 | Masui et al. |
| 5,793,913 | A | 8/1998 | Kovacic |
| 5,801,872 | A | 9/1998 | Tsuji |
| 5,812,708 | A | 9/1998 | Rao |
| 5,825,051 | A | 10/1998 | Bauer et al. |
| 5,828,679 | A | 10/1998 | Fisher |
| 5,854,804 | A | 12/1998 | Winer et al. |
| 5,889,903 | A | 3/1999 | Rao |
| 5,942,789 | A | 8/1999 | Morikawa et al. |
| 5,945,720 | A | 8/1999 | Itatani et al. |
| 5,946,438 | A | 8/1999 | Minot et al. |
| 5,970,081 | A | 10/1999 | Hirayama et al. |
| 5,987,196 | A | 11/1999 | Noble |
| 6,011,296 | A | 1/2000 | Hassard et al. |
| 6,031,243 | A | 2/2000 | Taylor |
| 6,043,515 | A | 3/2000 | Kamiguchi et al. |
| 6,066,860 | A | 5/2000 | Katayama et al. |
| 6,093,939 | A | 7/2000 | Artigue et al. |
| 6,125,217 | A | 9/2000 | Paniccia et al. |
| 6,202,165 | B1 | 3/2001 | Pine |
| 6,232,142 | B1 | 5/2001 | Yasukawa |
| 6,288,410 | B1 | 9/2001 | Miyazawa |
| 6,310,372 | B1 | 10/2001 | Katayama et al. |
| 6,318,901 | B1 | 11/2001 | Heremans et al. |
| 6,320,204 | B1 | 11/2001 | Hirabayashi et al. |
| 6,343,171 | B1 | 1/2002 | Yoshimura et al. |
| 6,346,717 | B1 | 2/2002 | Kawata |
| 6,392,342 | B1 | 5/2002 | Parikka |
| 6,393,183 | B1 | 5/2002 | Worley |
| 6,403,395 | B2 | 6/2002 | Hirabayashi et al. |
| 6,407,438 | B1 | 6/2002 | Severn |
| 6,426,522 | B1 | 7/2002 | Kean et al. |
| 6,528,799 | B1 | 3/2003 | Katsap et al. |
| 6,563,966 | B1 | 5/2003 | Tang ............ 385/10 |
| 6,645,829 | B2 | 11/2003 | Fitzergald |
| 6,677,655 | B2 | 1/2004 | Fitzergald |
| 6,680,495 | B2 | 1/2004 | Fitzergald |
| 6,770,134 | B2 | 8/2004 | Maydan et al. |
| 6,816,260 | B2* | 11/2004 | Peupelmann et al. ........ 356/364 |
| 6,905,542 | B2* | 6/2005 | Samoilov et al. .............. 117/89 |
| 7,453,132 | B1* | 11/2008 | Gunn et al. ................. 257/448 |
| 2002/0174826 | A1 | 11/2002 | Maydan et al. |
| 2002/0174827 | A1 | 11/2002 | Samoilov et al. |
| 2003/0015720 | A1 | 1/2003 | Lian et al. |
| 2003/0025118 | A1 | 2/2003 | Yamazaki et al. |
| 2003/0052082 | A1 | 3/2003 | Khan et al. |
| 2003/0052088 | A1 | 3/2003 | Khan et al. |
| 2003/0072548 | A1 | 4/2003 | Bhardwaj et al. |
| 2003/0110808 | A1 | 6/2003 | M'Saad et al. |
| 2003/0113085 | A1 | 6/2003 | M'Saad |
| 2003/0114006 | A1 | 6/2003 | White |
| 2004/0012041 | A1 | 1/2004 | West et al. |
| 2004/0012401 | A1 | 1/2004 | King et al. |
| 2004/0013338 | A1* | 1/2004 | Bjorkman et al. ............. 385/14 |
| 2004/0114853 | A1 | 6/2004 | Bjorkman et al. |
| 2005/0072979 | A1 | 4/2005 | West et al. |
| 2006/0039666 | A1* | 2/2006 | Knights et al. .............. 385/129 |

OTHER PUBLICATIONS

Jalali et al. "Advances in Silicon-on-Insulator Optoelectronics" IEEE Journal of Selected Topics in Quantum Electronics. Nov./Dec. 1998, pp. 938-947, vol. 4(6).

Janz et al. "Optical Properties of Pseudomorphic Si1-xGex for Si-Based Waveguides at the λ=1300-nm and 1550-nm Telecommunications Wavelength Bands". IEEE Journal of Selected Topics in Quantum Electronics. 1998, pp. 990-996, vol. 4(6).

Kimerling. "Photons to the Rescue: Microelectronics Becomes Microphotonics" The Electrochemical Society Interface. Summer 2000, pp. 28-31.

Kostal and Park. "Nano-optics: New Rules for Optical System Design" NanoOpto White Paper 2002.002. Jun. 2002, pp. 1-10.

Kostal. "Nano-optics Changes the Rules for Optical Components" NanoOpto White Paper 2002.001. Jun. 2002, pp. 1-6.

Motorola Labs. "The Discovery: Motorola Labs solves a 30-year semiconductor industry puzzle" Jun. 2002.

Pearsall et al. "Spectroscopy of Band-to-Band Optical Transitions in Si-Ge Alloys and Superlattices" Physical Review B. 1998, pp. 9218-9140, vol. 57(15).

Schaub et al. "High-speed Monolithic Silicon Photoreceivers on High Resistivity and SOI Substrates" Journal of Lightwave Technology. Feb. 2001, pp. 272-278, vol. 19(2).

Schuppert et al. "Optical Channel Waveguides in Silicon Diffused from GeSi Alloy". Electronics Letters. 1989, pp. 1500-1502, vol. 25(22).

Soref et al. "Large Single-Mode Rib Waveguides in GeSi-Si and Si-on-SiO2". IEEE Journal of Quantum Electronics. 1991, pp. 1971-1974, vol. 27(8).

Soref et al. "Optical Waveguiding in a Single-crystal Layer of Germanium Silicon Grown on Silicon" Optics Letters. 1990, pp. 270-272, vol. 15(5).

Splett et al. "Low Loss Optical Ridge Waveguides in a Strained GeSi Epitaxial Layer Grown on Silicon" Electronics Letters. 1990, pp. 1035-1037, vol. 26(14).

Tashiro et al. "A Selective Epitaxial SiGe/Sl Planar Photodetector for Si-Based OEIC's" IEEE Transactions on Electron Devices. 1997, pp. 545-550, vol. 44(4).

Temkin et al. "Ge0.6 Si0.4 Rib Waveguide Avalanche Photodetectors for 1.3 μm Operation" Appl. Phys. Lett. 1986, pp. 809-811, vol. 49(13).

Temkin et al. "Gex Si1-x Strained-Layer Superlattice Waveguide Photodetectors Operating Near 1.3 μm" Appl. Phys. Lett. 1986, pp. 963-965, vol. 48(15).

Walker and Jahns "Optical clock distribution using integrated free-space optics" Optics Communications. 1992, pp. 359-371, vol. 90.

Walker et al. "Design and fabrication of high-efficiency beam splitters and beam deflectors for integrated planar micro-optic systems" Applied Optics. May 10, 1993, pp. 2494-2501, vol. 32(14).

Yabu et al. "New Design Method for Low-Loss Y-Branch Waveguides" Journal of Lightwave Technology. Sep. 2001, pp. 1376-1384, vol. 19(9).

Yang et al. "A high speed, high-sensitivity silicon lateral trench photodetector, IEEE Electron Device Letters" vol. 23, No. 7, pp. 395-397, Jul. 2002.

Densmore, A. et al., "Arrays of wavelength monitoring photodetectors for WDM and fiber sensing applications", Integrated Optics Devices V, Proceedings of the SPIE—the International Society for Optical Engineering SPIE-Int. Soc. Opt. Eng USA, San Jose, CA, vol. 4277 (Jan. 23-25, 2001) pp. 77-84, XP002427097.

Li, K. et al., "New Photodetector with Cascaded Waveguide Photodiodes and Resonant Electrode Structures for Millimeter-wave Subcarrier Optic Fiber Link Systems", Proceedings of the SPIE—the International Society for Optical Engeineering SPIE-Int., Soc. Opt. Eng USA, vol. 3795, (Jul. 1999) pp. 507-514, XP002427096.

Supplementary European Search Report for PCT/US2004/017210, Apr. 13, 2007, 4 pages.

\* cited by examiner

SERIAL ROUTING OF OPTICAL SIGNALS

This application claims the benefit of U.S. Provisional Application No. 60/474,164, filed May 29, 2003, which is incorporated herein by reference.

TECHNICAL FIELD

The invention generally relates to a method and apparatus for distributing optical signals in a semiconductor chip or substrate.

BACKGROUND

In certain applications, there is a need to broadcast a common signal to multiple locations on an IC chip. A control signal that operates multiple switches is one example of a signal that might be broadcast to multiple locations. A more common example is an electronic clock for synchronizing multiple devices on the chip. Yet another common example is the use of broadcast distribution of information on a signal bus, where one location distributes signals to many locations in a broadcast mode.

Electronic clocks are limited by timing jitter from variations in the electrical transmission of the high bandwidth signals. This limitation is expected to be a serious detriment to performance in microprocessors as they approach clock speeds around or above 20 GHz. Also, on large microprocessor chips, the distribution of electronic clock signals can account for up to 5–15% of the total heat generated by the chip.

Distributing the clock as an optical signal could solve some of the more serious problems that are presented by distributing the clock as an electrical signal. The use of optical clocks offers the potential of helping enable the continued growth in microprocessor speed and achieving operational efficiency if a means can be found for implementing the optical clock in a production process at low cost and high efficiency.

The combination of silicon and SiGe alloy (e.g. $Si_xGe_{1-x}$) has attracted attention as useful combination of materials from which one might be able to easily and economically fabricate optical signal distribution networks. With $Si_xGe_{1-x}$ it is possible to fabricate waveguides in the silicon substrates. The index of refraction of $Si_{0.95}Ge_{0.05}$ is slightly higher than that of silicon. For example, at a wavelength of 1300 nm to which silicon is transparent, $Si_{0.95}Ge_{0.05}$ with 5% Ge has a index of refraction of about 3.52 while crystalline silicon has an index of refraction that is less than that, e.g. about 3.50. So, if a $Si_xGe_{1-x}$ core is formed in a silicon substrate, the difference in the indices of refraction is sufficient to enable the $Si_xGe_{1-x}$ core to contain an optical signal through internal reflections. Moreover, this particular combination of materials lends itself to the use of conventional silicon-based semiconductor fabrication technologies to fabricate the optical circuitry.

The detectors that are most frequently considered for use in such optical signal distribution networks are low cost silicon-based detectors. Using silicon-based detectors, however, presents a fundamental challenge. Since the waveguides are made of silicon (i.e., SiGe), the wavelengths that are used for the optical signal must pass through the silicon without being absorbed. That is, the silicon must be transparent to those wavelengths. But to work as a detector, the silicon-based device must absorb that wavelength to be able to convert it into an electrical signal. Thus, such silicon-based detectors are typically characterized by a low-absorption efficiency. This typically means very high optical power levels must be used to create sufficient photocurrent to drive the detectors at the speeds required which means expensive lasers must be used.

SUMMARY

In general, in one aspect, the invention features an optical signal distribution network that includes a semiconductor substrate including a waveguide formed therein to carry an optical signal; and a plurality of detectors serially arranged along the length of the waveguide. Each of the detectors is capable of detecting the optical signal passing through it and sufficiently transparent to that optical signal so as to enable the optical signal to reach and be detected by all of the plurality of detectors.

Other embodiments include one or more of the following features. The substrate is silicon and the waveguide is SiGe. The waveguide is serpentine in shape. And the optical signal is an optical clock signal. In addition, the optical signal distribution network further includes a second waveguide formed in the semiconductor substrate; and a second plurality of detectors serially arranged along the length of the second waveguide. Each of the detectors of the second plurality of detectors is also capable of detecting the optical signal of wavelength λ passing through it and sufficiently transparent to said optical signal to enable the optical signal to reach and be detected by all of the second plurality of detectors. The optical signal distribution network also includes an optical splitter formed in the semiconductor substrate for receiving an optical input signal and splitting it into a first and second optical output signals, wherein the first waveguide is coupled to the splitter to receive the first optical output signal and the second waveguide is coupled to the splitter to receive the second optical output signal.

Though the individual detectors that are used in the optical signal distribution system described herein have low absorption, the manner in which such detectors are used enables one to significantly improve the overall absorption efficiency of an optical signal distribution system. In addition, the serial arrangement along a single waveguide also allows for designing signal distribution systems that have a higher density of signal take out points on the chip without requiring the use of additional complicated optical elements.

Other features and advantages of the invention will be apparent from the following detailed and from the claims.

DETAILED DESCRIPTION

Figure 1:
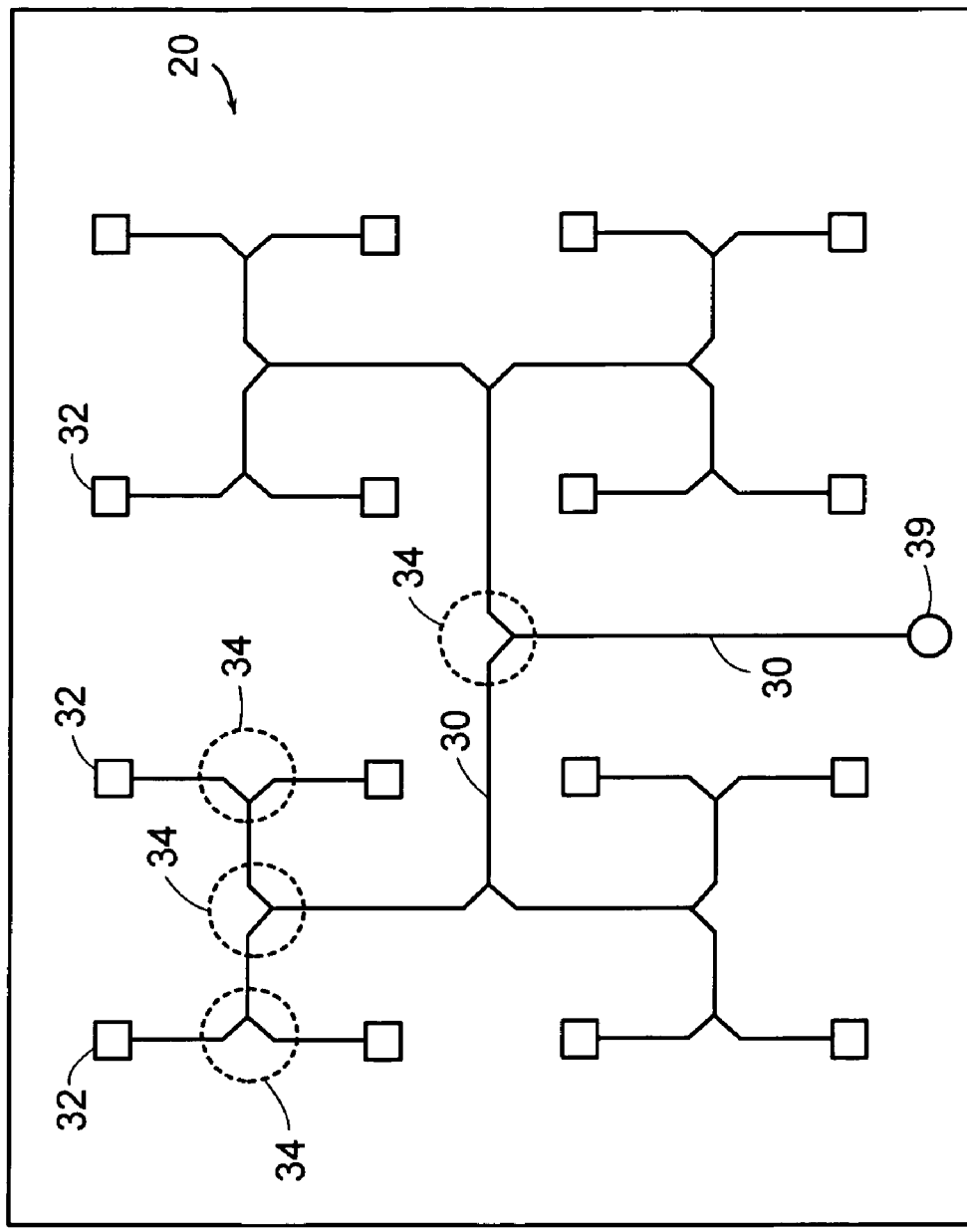
FIG. 1 illustrates an H-tree optical signal distribution network.

An H-tree network is one conventional way of distributing clock signals to many geographically different locations in a network. In general, the H-tree network is an array of H-shaped branches nested inside of other H-shaped branches, as depicted in FIG. 1. The H-tree name comes from the geometric shape of the structure that looks like the letter "H", with two smaller distribution branches coming off each branch in progression to smaller branches that provide full distribution. The advantage of an H tree is that a symmetric distribution structure can be created with equal length and time paths from the source to each end point and works with clock distribution with synchronous receipt of signals at all end points for all frequencies of signals. In some ways, the H-tree network also lends itself to use in an optical signal distribution or broadcast network. In the structured network of waveguides 30 there are multiple optical splitters 34, one at each location at which the network branches from one waveguide 30 into two waveguides. In the H-tree network, the end points of the branches represent points to which the signal is to be distributed. So, at every end point there is an optical detector 32, or a optical tap for sending the signal up toward the circuitry to which the optical signal is being supplied. There is also a point at which the optical signal is introduced into the network. In the depicted embodiment, this is a light source 39 embedded in the chip. Alternatively, it could be a mirror, grating, or other optical coupler within the waveguide and by means of which the optical signal is directed into the waveguide from a source that is located above or below the chip, or a coupler through the edge of the chip.

The H-tree design has some drawbacks as a way of broadcasting an optical signal, such as an optical clock signal, throughout a semiconductor chip. First, it requires Y-branches or Y-splitters at every split. In optical circuits fabricated by using conventional semiconductor fabrication techniques, it can be very difficult, if not impossible, to make high quality, efficient Y-branches at 90 degrees with narrow or small turning radius, especially with lower refractive index contrast materials such as SiGe waveguides in silicon. They tend to be characterized by large signal loss at the junction because of the difficulty of fabricating a sharp, acutely angled corner on a semiconductor wafer and lack of Total Internal Reflection for low index contrast materials. Second, the H-tree network wastes power if the detectors are not efficient absorbers of light, and for optical signals, power can be an expensive commodity. Nevertheless, sufficient optical power must be delivered to the end points so that over the range of operating conditions to which the devices (in particular, the optical detectors) will be exposed, the power will always be sufficient to be detected. But the light that is not absorbed at the end point should not be reflected back up the waveguide. Reflected optical signals can seriously disrupt the generation of the clock signal and cause the system to malfunction.

So, in the H-tree distribution network with detectors at endpoints, the low absorption of the detectors could prove to be a disadvantage. But the low absorption characteristic of the silicon-based detectors can actually be used to advantage by using a different approach in designing the optical signal distribution network for broadcasting a signal, e.g. an optical clock signal.

The described embodiment of the invention solves the problem of low detector absorption by reusing the unabsorbed light in downstream detectors. That is, multiple detectors are distributed in series along the waveguide so that the downstream detectors will use the unabsorbed light passing through the upstream detectors. The use of a single waveguide for transmission to multiple locations also enables one to significantly reduce the size and area of the distribution network needed to distribute the optical signals.

Figure 2:
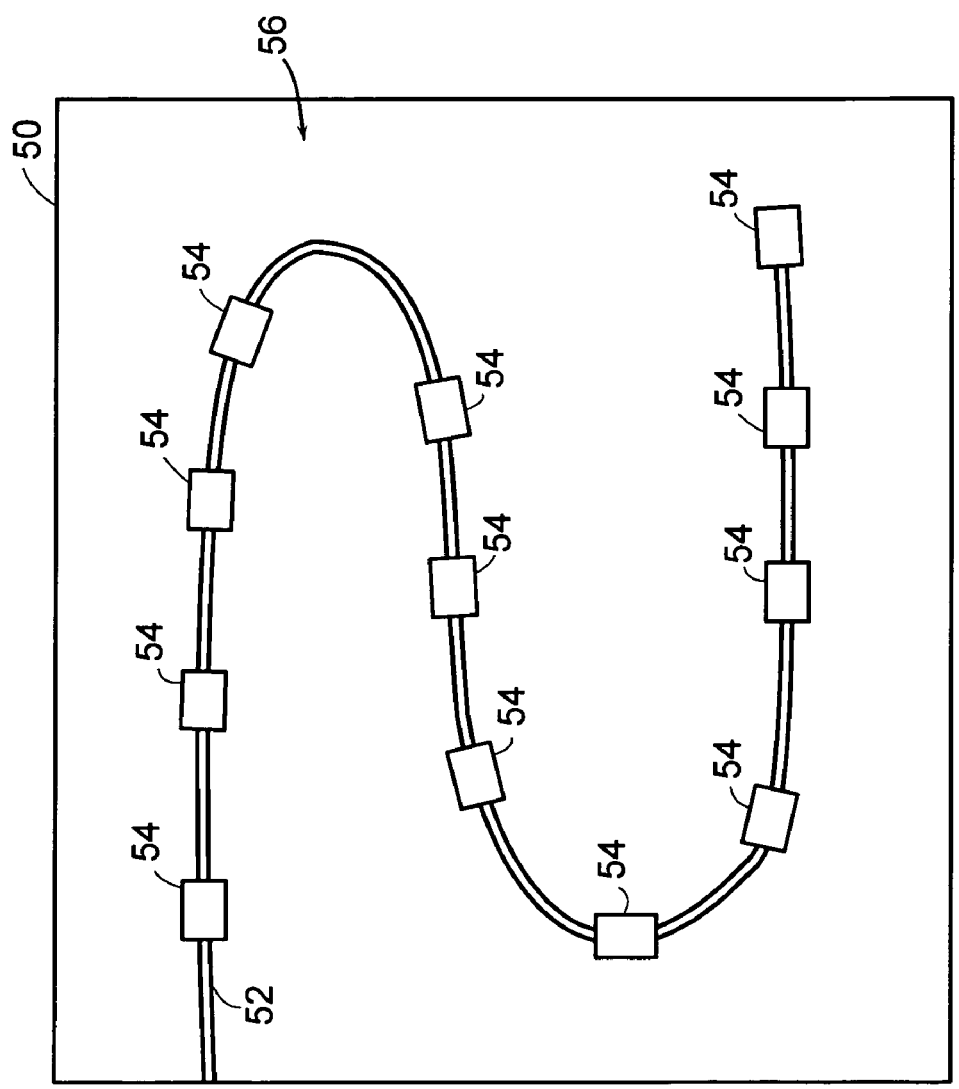
FIG. 2 illustrates an optical signal distribution network that embodies the serial routing concept.

An optical signal distribution network which embodies this concept is illustrated in FIG. 2. A waveguide 52 is formed in a silicon substrate 50. In the described embodiment, the waveguide includes a $Si_xGe_{1-x}$ core surrounded by a cladding that is the silicon of the substrate. Because $Si_xGe_{1-x}$ (e.g. where x=0.95) has a higher index of refraction that the surrounding silicon, the $Si_xGe_{1-x}$ core acts to contain the optical signal and thus it functions as a waveguide.

Arranged along the length of and within waveguide 52 are a number of low absorption detectors 54, e.g. silicon-based detectors that convert a portion of the optical signal that passes through them into an electrical signal. Detectors 54 are placed in locations dictated by the microelectronic circuitry that is to be fabricated on another layer aligned above, below, or distributed beside the optical signal distribution layer. To reach all of the clock signal distribution points, the waveguide may need to have a serpentine form with a number of bends 56, the number dictated by the distribution of clock signal take out points as well as the by the losses associated with the bends. Bends and waveguide interfaces to the detector will inevitably produce optical losses above that of the waveguide transmission loss per length due to scattering, absorption and other waveguide effects. So, there will be a need to optimize the number of bends that are used and the number of take out points based on waveguide losses per length, the interface losses to the detector, and bends versus detector absorption, as will be discussed later.

The optical signal is introduced into the waveguide using one of several different approaches. According to one approach, the waveguide has at its source end a mirror, grating, or other coupling element fabricated into the waveguide. The optical signal is provided from above or below, e.g. by an optical fiber with an appropriate arrangement of lenses to focus the light onto the mirror element. A variety of mirror or coupler elements are known in the art. One example is a Bragg grating formed in the SiGe core and with the spacing selected to reflect light through an angle that causes the light to be coupled from above or below. Another example is a single reflecting surface from a metal or Total Internal Reflection at an oxide interface that is fabricated within the waveguide channel prior to or after depositing the SiGe core. Another approach is to introduce the optical signal laterally through the side and directing it down the longitudinal axis of the waveguide, again using an appropriate arrangement of optical fiber and lenses to focus the light. In any event, for optical signals that are broadcast to many endpoints, such as would likely be the case for an optical clock signal, theoretically the optical signal needs to be introduced at only a single point.

If the optical signal distribution circuit is for distributing an optical clock signal, the detected optical clock signals that are generated farther down the waveguide will exhibit greater delay or skew, than the earlier ones, because the detection points are no longer of equal transit time from the source as in an H-tree. Skew is the variation of clock timing from point to point and can be more predictable in optical circuits. By comparison, timing jitter is the time variation in clock signal from pulse to pulse, and is less predictable. The advantage of using optical signals, however, is that the skew is more predictable and determinable. Furthermore, in the optical clock signal distribution network, the skew in the clock signals is not as much a function of the clock frequency or wire parameters and manufacturing variations as in electrical clocks; it is more simply a function of the distance along the waveguide. Because of these characteristics, one can either take the skew into account when designing the microelectronic circuitry that receives the clock signals or one can include correcting circuitry at each of the points at which the clock signal is made available to the microelectronic circuitry.

Clock skew is a common problem that must be dealt with in a clock signal distribution network and the problem is readily solvable using techniques that are well known in the field. The circuitry for solving the problem can typically include a phase lock loop or receiver node circuit combined with a deskewing circuit. The phase lock loop (PLL) circuit locks an internal clock to the input clock signal in a way that averages the input clock signal for lower jitter, and can convert the input synchronous clock signal to a higher or lower frequency output with different phases. The deskewing circuit is a programmable delay circuit that can remove fixed skew, or clock timing error, at a given point. In essence, the delay that is required to remove the skew is programmed into the signals that are extracted early on along the optical signal distribution chain. These types of deskewing circuits reduce the fixed clock skew among detectors, allowing random placement of detectors in the circuit according to the needs of the circuit designer.

A number of factors need to be taken into account when designing a serial optical signal distribution system such as the one depicted in FIG. 2. First, a design compromise must be chosen between optical efficiency and signal uniformity through the length of the waveguide distribution line. More of the optical power can be productive if the optical power is allowed to be usefully absorbed in detectors through the serial path. But if excessive optical loss occurs in the serial link, the optical power will be reduced at the end of the optical path and the effect of the optical power will not be uniform across all detectors in the serial path. Presentation of a less uniform optical power to a signal detector can affect detector signal voltage, speed, jitter, and latency. Latency is the time between change in optical signal presented on the detector to a useful electronic output change in signal. The effect of the power drop on the circuit can be compensated in some designs for detectors, or couplers from waveguides to detectors, that increase the optical coupling as the optical power drops in a predictable fashion so as to maintain a constant signal on the detector in the presence of predictable optical loss.

On the other hand, if too little power in the waveguide path is productively removed by each detector so as to allow a more uniform beam, then optical power is wastefully discarded at the end of the path. So an optically efficient design will use all the power to the extent possible and maximize the useful absorption in the detector, while minimizing unproductive optical losses, up to the maximum tolerable variation in power. A good compromise may be an optical loss between 10% to 90% through the optical path, depending on compensation mechanisms discussed above and tolerance for variations in signal on part of the electrical design.

As part of the loss calculation in the above compromise, non-productive optical losses, which must be minimized, should be taken into account. These non-productive losses occur from waveguide interface scattering and absorption, waveguide bend radiation losses, and inefficient coupling or scatter losses in transmission through a detector or coupler to a detector. Most important, the waveguide needs to be a sufficiently low loss waveguide so that the optical power losses over the entire length of the path can allow a relatively uniform signal to be distributed to all devices as discussed by the above compromise. If the waveguide is implemented on an IC chip that is on the order of 1 cm by 1 cm, then this means that the losses attributable to the waveguide itself should be less than about 1 db/cm. (Note that db is defined as 10 times the logarithm (base 10) of power transmission. So a 1 db loss (or −1 db) corresponds to a transmission of 79.4%, or a loss of 20.6%. Second, the bends need to be low loss bends (e.g. <1 db/bend) and the maximum number permitted will depend on what the precise loss is for each bend, again within the limit of the above compromise. Clearly, the lower the losses associated with each bend, the more bends that can be used along the waveguide. It is known that higher Ge content in the SiGe core permits a tighter bend radius. Thus, for example, with 7–10% Ge content one can fabricate bends of the radius that would be required for building a serpentine waveguide structure on a 1 $cm^2$ chip.

As indicated above, the most important use of the serial routing is the ability to use low absorption detectors. That is, they will allow a large percentage of the optical signal to pass through to the next detector along the waveguide. For example some small length and low absorption detectors may only absorb 0.1% to 1% of the light. The remaining 99.9% to 99% of the light can be usefully absorbed by other detectors in the chain. Moreover, the transmission of the detectors needs to be stable over temperature range, age, operating power, voltage, and other environmental factors, so that under all conceivable reasonable operating conditions the optical signal that arrives at the end of the waveguide will not fall to levels that are too low to be detected by the last detector in the waveguide. The level of the optical variation along the path that can be allowed in the worst case of environmental factors is similar to that needed for optical uniformity along the optical path as previously discussed. This environmental variation is indeed part of the design that must be included in determining how much unproductive loss should be tolerated by discarding the optical power at the end of the path. As such, detectors and other coupling devices should be designed so as to minimize the change in their absorption with temperature and other environmental factors. This device stability is important because a large variation in optical transmission may require a system design with lower loss optical path with inefficient discard of optical power in order to allow for an environmental change with a greater optical loss and non-uniformity.

An improvement is to place a low absorption detector in an optical resonator for the wavelength to be detected, which allows more absorption and photocurrent at a given or lower optical power. For example, a cavity can be created by using two mirrors spaced on opposite sides of the absorber with a separation that causes the light to resonate through constructive interference. These mirrors can be created by a thin metal, a dielectric stack, or a periodic pattern along the waveguide as in a Bragg grating. The Bragg grating has a special advantage in that it can be made very narrow band in wavelength, even narrower than the resonator bandwidth. So, if light is not amplified it will not be reflected either.

Other resonators for the detector can be made with waveguide rings in close coupling to the serial waveguide, which would also only detect light at the resonant wavelength and transmit light at other wavelengths. The limitation of a resonator is that it must be sufficiently stable over all temperatures and not reflect sufficient light back down the waveguide that could cause interference with the optical source. Both of the above-mentioned resonators could accomplish this task with good engineering.

Figure 3:
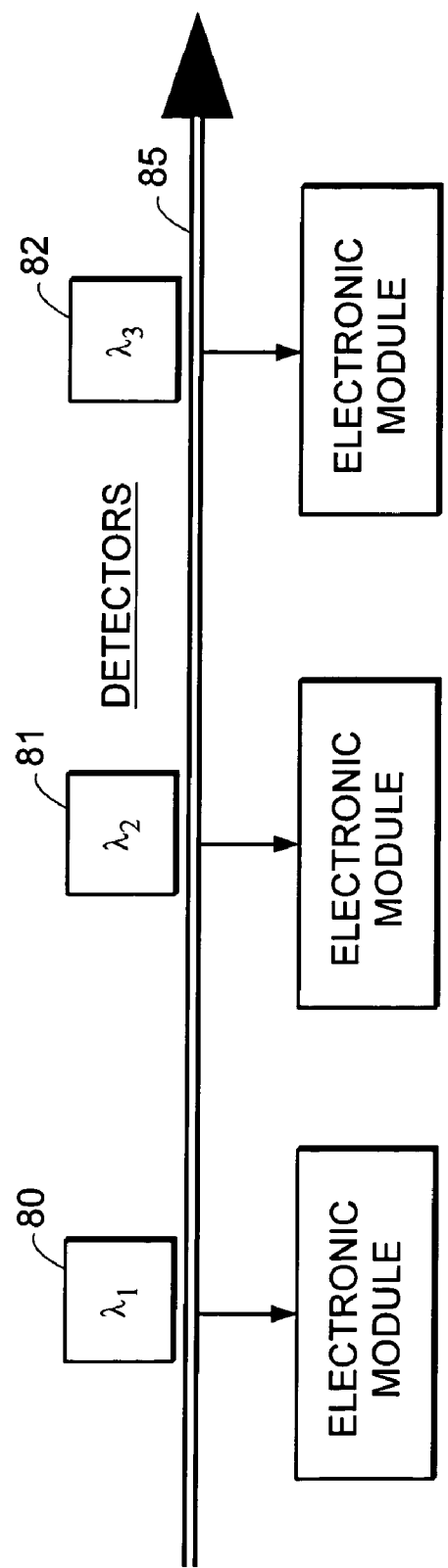
FIG. 3 illustrates the use of wavelength dependent multiplexing via wavelength selective detectors on a single line.

Using such an approach, multiple resonators could be made that only detect one wavelength in a multiplexed wavelength distribution scheme, and the light at other wavelengths that is not absorbed is efficiently transmitted to other detectors on the waveguide. This is schematically illustrated in FIG. 3 in which detectors 80, 81 and 82, each of which detects a different wavelength $\lambda_1$, $\lambda_2$, and $\lambda_3$, are distributed in series along an optical waveguide 85. The electrical signal generated at each detector is passed up to a different corresponding electronic module 86, 87, and 88.

An advantage of the wavelength-multiplexed detector is that it allows multiple independent distribution channels to share the same waveguide for more efficient and compact routing. Multiple sources could each be broadcast at their own frequencies or wavelength, and the cavity could be built or tuned to receive the signal needed at a given point. This would allow directed broadcast to selected points by choosing to broadcast at the appropriate wavelength at which those points are tuned. This method would allow the use of an addressed, high-speed signal input globally about a silicon chip.

In another method for receiving signals at selective points on the chip, the optical signal could be coded by a phase shifting or amplitude modulation to which only selected detectors will respond. This may require use of electronic filtering or tuning. Electronic filtering could also be used to receive signals that are digitally coded to only be received by the selected receivers.

Another advantage of a wavelength selective detector is that it works with a chirped optical source. A chirped optical source is one that changes its wavelength over time. If this is controlled so that the wavelength change occurs periodically with each pulse in a clock, the detector could be tuned to a particular time delay needed to adjust the clock skew at that point.

Any one of a variety of alternative waveguide designs can be used. This includes $Si/SiO_2$ waveguides, silicon nitride waveguides, polymer waveguides, and combinations of these materials. Many of these materials would not be compatible with a SiGe substrate approach and would best be placed within or above the electrical wiring plane.

Any one of a variety of alternative detector designs can be used. This includes SiGe super-lattice detectors, strained silicon detectors, Ge bandgap absorption, and impurity-based SiGe detectors, the details of which are provided below. Some of these detectors such as with Ge bandgap have high absorption. Nevertheless, a low absorption detector can be made by use of thin Ge detectors, or by coupling light out of the waveguide in the peripheral of the waveguide where the light is weak. These approaches could have advantage in allowing for a smaller, low capacitance detector that needs less photocurrent and therefore less light to switch in a given time. Another advantage is that coupling at the peripheral edge of the waveguide could simplify design and routing.

Some other precautions need to be taken to achieve stability of the distributed clock signal. For example, reflections back to the source of the clock signal needs to be minimized to avoid disrupting the source that generates the clock signal as well as the phase locked loop circuits located above the detectors further up the line. Ways of reducing the back reflections at the transitions between components includes providing angled or curved interfaces at those points and matching the indices of refraction between the components (i.e., use low Δn interfaces) surfaces, again to reduce the chance of back reflection (i.e., match indices of refraction). There must also be good mode matching between the waveguide and the detectors to reduce discontinuities seen by the optical signal that will cause scattering and to more effectively concentrate the optical signal within the detecting region of the detector. At the endpoint, the light must be disposed of in a way that does not reflect or allow stray light to affect the circuit. The light can be radiated without reflection in many ways. This could be by a very short bend radius that cannot confine the light. The light will then be distributed in a wide angle with very little reflection. The end of the waveguide could be angled so interface reflections are not directed back down the waveguide. The scattered light could inadvertently negatively affect other devices and create cross talk or noise. This scattered light can be controlled by engineering where this light is directed, and properly absorbing this light before it can negatively affect other devices. This light can be absorbed by free electrons and other parasitic mechanisms in the wafer.

Alternative Designs

Figure 4:
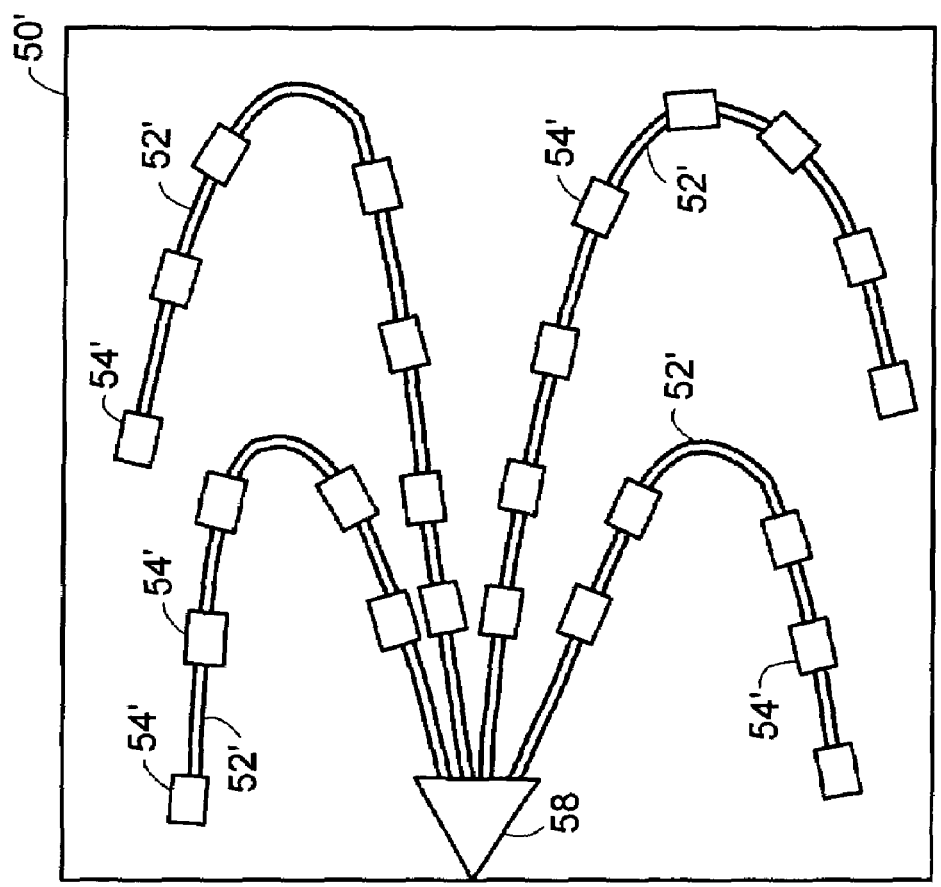
FIG. 4 illustrates another optical signal distribution network that also embodies the serial routing concept.

FIG. 4 shows an alternative approach to designing an optical signal distribution network. The system includes multiple waveguides 52', each one servicing a different area of the chip. In the example illustrated there are four waveguides 52', each of which includes multiple detectors 54' arranged serially along its length.

The purpose of providing a combination of serial and parallel optical paths is to provide more distribution options in the presence of high optical loss. If after all improvements, the loss in a given optical path is too high for the uniformity compromise discussed earlier, then by splitting the path into multiple paths, all detector elements can nevertheless be reached in a uniform manner.

The four waveguides are connected to a multimode interference (MMI) splitter 58 that divides the power of an incoming optical signal into n identical signals each delivered to a different one of n outputs to which a corresponding waveguide 52' is optically connected. The MMI splitter 58 uses a well known technique for splitting an optical signal into multiple optical signals having the same power. By using multiple waveguides emanating from a single source, it is possible to reduce the number of bends that are required in any single waveguide.

A split of the power into multiple waveguides could also be done by serial chain of multiple Y-splitters or MMIs with less number of output waveguides. A distribution using serial splitters may be a more efficient design in some optical arrangements needing multiple paths. In any case, the distribution network could include many combinations of serial and multiple paths, with optical power splitters creating a multiple path branch for any given serial path at any of many points as needed for useful routing.

An alternative to splitting the optical signal after it is introduced into the chip is to split it beforehand. In that case, each of the four waveguides 52' is fed by a separate source using techniques such as were described above.

Figure 5:
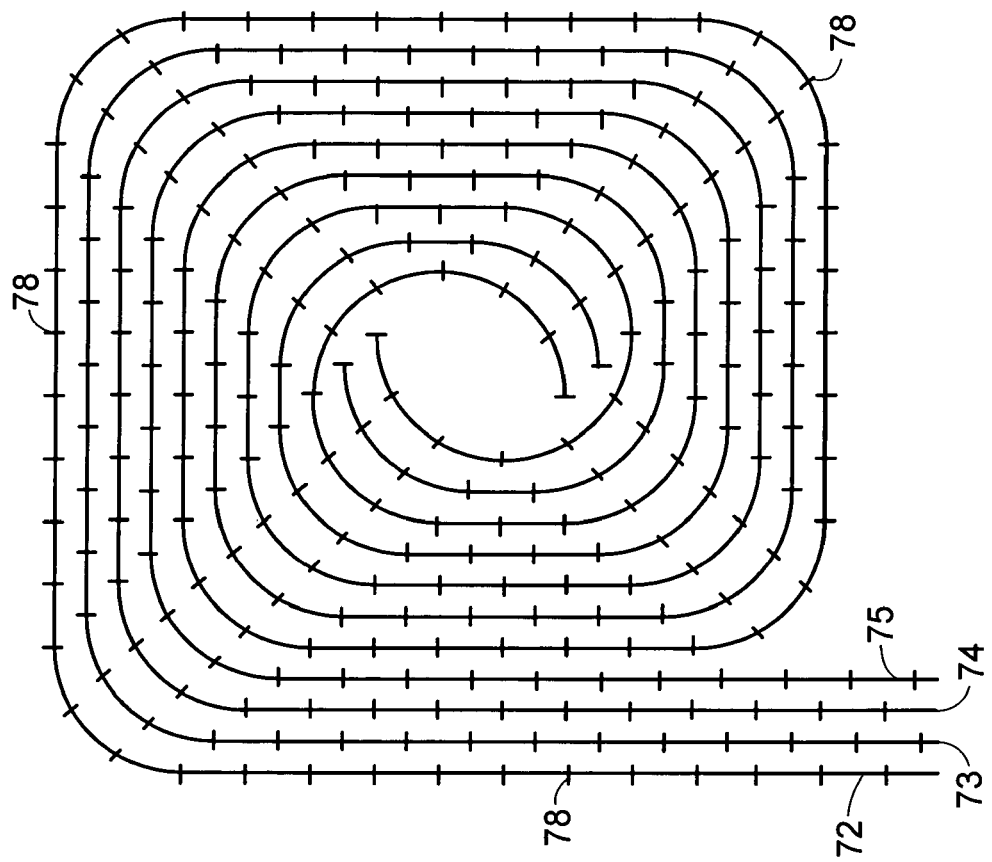
FIG. 5 illustrates another optical signal distribution network that also embodies the serial routing concept.
Figure 6:
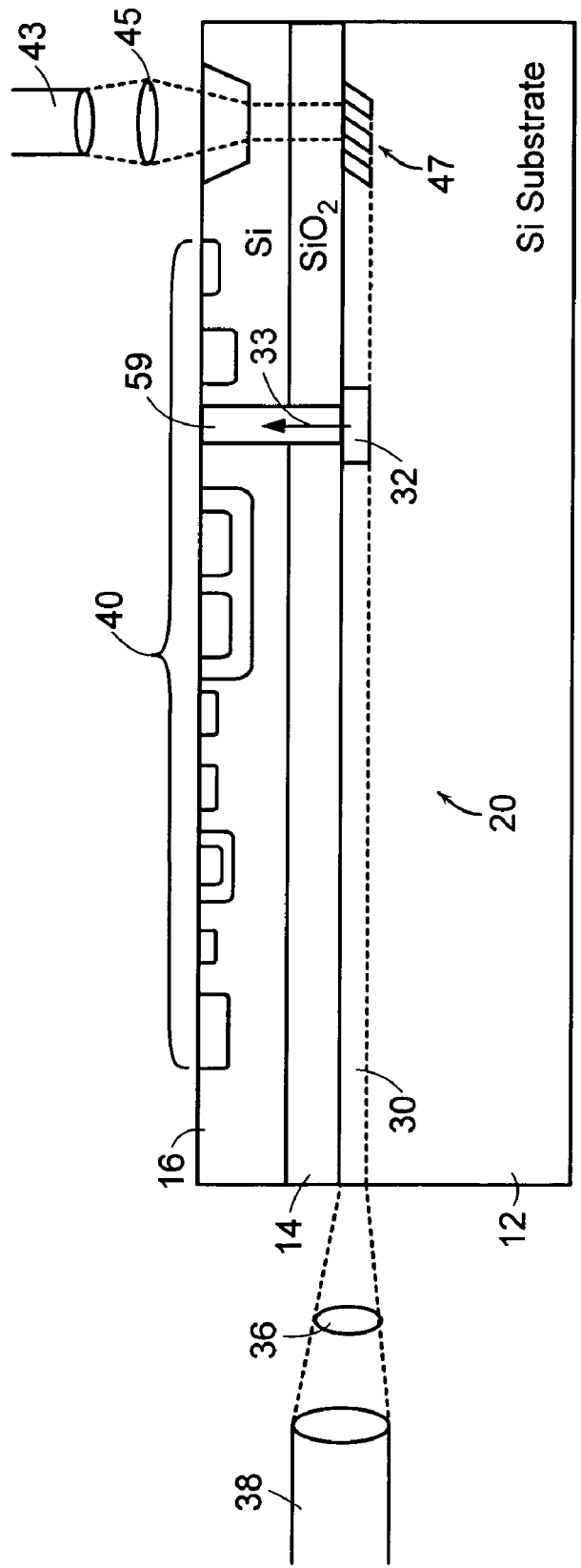
FIG. 6 illustrates the concept of an optical ready substrate in which the serial routing concept can be utilized.

FIG. 5 illustrates another optical signal distribution network that also embodies the serial routing concept. In this example, four independent optical signal distribution lines 72, 73, 74, and 75 (i.e., waveguides) are illustrated. Each of the optical waveguides includes multiple optical detectors 78 spaced along its length. In this case, the same signal can be distributed on all lines by use of a splitter before the waveguides, or separate optical sources can be distributed on each line.

Broadcasting Signals

The use of optical routing with serial signal detection as described above is also useful for high speed, high bandwidth, broadcast of signals to multiple points in an electronic chip. The source of the signal could be off chip or on chip. If the signal originates off chip, the external device creates the useful optical information from the more standard electrical form. This is typically done with electrical modulation of lasers such as edge emitting semiconductor lasers or Vertical Cavity Surface Emitting Lasers (VCSEL) or other light sources, usually by modulation of the driver current. In some applications, such as those requiring very high speed (above 10 GHz), the laser cannot be modulated efficiently and modulators external to the light source are used to create the signal as the light passes through the modulator. The modulator typically changes the absorption or transmission of a material through which the light passes by placement of a voltage upon the material. Thus, a source of regular (continuous or regularly pulsed) light must be incident on the modulator. The modulator then adds the modulation signal by absorbing or deflecting some of the light. This modulation effect can occur, for example, by refractive index and absorption changes caused by free electron injection, by band gap narrowing caused by the applied field that causes an increase in absorption, or by thermal changes to the material caused by electrical heating. If the refractive index change is used to modulate, then an interferometer such as a Mach-Zehnder or Fabry-Perot must be used to convert the phase change (from the refractive index change slowing down the light) into a power or amplitude modulation by interfering this phase modulated light with another signal. Electrical to optical signal transmitters based on both lasers and modulators are common in the industry.

In the case of a broadcast source originating on the electronic chip, a similar approach of modulating a laser or modulating a signal that is being transmitted is used. However, due to the high difficulty of creating a laser within a silicon chip, a modulator may be preferred. In this case a regular (continuous or regularly pulsed) optical source is provided to the on-chip modulator that then place a useful signal on the optical beam.

Whether the signal is generated on or off-chip, the signal can be broadcast to multiple points on the chip. One previously mentioned application involved distributing optical clocks. However, additional useful system applications could be: the broadcast of control information to multiple points on the chip to improve synchronous behavior of circuits; the distribution of data on a bus to multiple points on a chip for lower latency or use in parallel computation; or the rapid communication between points on a chip that is faster using optical than electrical signals. If data is to be distributed on a waveguide, often multiple bits are desired to transmit in parallel. Today's microprocessors use 8, 16, 32, and 64 bit wide buses in which that number of bits is transmitted and received on a similar number of wires simultaneously. It should be noted that optical waveguides can reduce the number of wires by simultaneously encoding each bit on a different wavelength, or frequency channel, within the same waveguide. This could improve synchronous reception as a result of using identical path distances for all bits, and it would reduce the number of lines needed to transmit information. However, a wavelength sensitive detector array, or a dispersive optical element that breaks apart each wavelength to a broadband detector is required. Dispersive elements common in the industry include Bragg filters, interfering waveguide arrays, and interferometers. As previously noted, the wavelength selective detector can be created with a broadband detector by placement within or behind an optically resonant structure to only be sensitive to the wavelength of interest. A wavelength selective detector can also be created by causing the band gap to change by controlled effects such as diffusion of an impurity. Then, the light could be absorbed by the wavelength selective detector in series on the waveguide. In this case, the detector will allow all longer wavelengths to pass while absorbing all shorter wavelengths (with energy larger than the band gap), so the shortest wavelength detectors must be placed at the beginning of the detector chain.

The Optical Ready Substrate

It is envisioned that a particularly useful application of the serial routing concepts discussed above is in connection with the optical ready substrates that are described in detail in U.S. patent application Ser. No. 10/280,505, filed Oct. 25, 2002, entitled "Optical Ready Substrates," and U.S. patent application Ser. No. 10/280,492, filed Oct. 25, 2002, entitled "Optical Ready Wafers," both of which are incorporated herein by reference. Because of the relevance of serial routing concept to the optical ready substrate, it is worth understanding the optical ready substrate concept.

In essence, the underlying principle behind optical ready substrates is that the optical signal distribution network is provided in such a way that its fabrication and the fabrication of the microelectronic circuitry are done totally or largely independently of each other.

The optical ready substrates provide a platform upon which electrical circuitry can be fabricated using conventional semiconductor fabrication techniques. By separating the optical signal distribution circuitry from the electrical circuitry in this way, the semiconductor microelectronics manufacturer avoids having to develop a new technology or know-how for fabricating optical components on a semiconductor wafer. The semiconductor microelectronics manufacturer also avoids having to optimize its processes for fabricating the semiconductor electronics so as to also accommodate the fabrication of the optical components. Thus, for example, a company making CMOS circuitry that has optimized its fabrication processes for achieving ultra high precision and very high yields need not be concerned with having to modify its processes and possibly compromise its ultra high precision and high yields to also make optical elements along with the electrical components. In short, the semiconductor microelectronics manufacturer can simply rely on the expertise of an optical fabrication company to provide the optical elements and to optimize those processes and can, except for locating and making connections to the underlying optical signal distribution network, process the wafer just as though it was a blank semiconductor wafer. Of course, that is the ideal. In practice, the separation between the two technologies may not be as clean as that.

An embodiment of an optical ready substrate 10 is shown in FIG. 5. Optical ready substrate 10 contains a semiconductor integrated optical signal distribution network 20 for distributing an optical clock signal to semiconductor integrated microelectronic circuitry 40 that was fabricated on top of the substrate above the optical circuitry at a later stage. Optical ready substrate 10 is an epi-silicon or SOI (silicon-on-insulator) structure that could include a base substrate 12 of crystalline silicon, an insulating layer 14 of SiO2, and a thin upper layer 16 of crystalline silicon. Optical signal distribution network 20 is fabricated in substrate 12 just below insulating layer 14. Network 20 employs one or more of a number of fundamental building blocks, including optical waveguides 30 for distributing the optical signals between different locations on the chip; reflecting elements 47 for enabling optical signals to be introduced into the waveguides from above the chip or enabling optical signals to re-directed out of the waveguides; photodetectors 32 for converting the optical signals to electrical signals 33 that will be used by corresponding components of the microelectronic circuitry; and splitters (not shown) that divide the optical signals into multiple (in this case, two) components where branching occurs in the distribution network.

The optical input signal can be supplied in a number of different ways. According to one way, referred to generally as an edge coupling approach, a lens arrangement 36 focuses light from an external optical fiber 38 into optical waveguide 30. Alternatively, an optical fiber 43 delivers light through another arrangement of lenses 45 to waveguide 30 from a direction that is directed through the top or bottom surface of the chip. In this case, a reflecting element 47 fabricated within waveguide 30 redirects that light into waveguide 30 along its longitudinal axis. Light can be extracted by using components similar or identical to reflecting element 47, lenses 45, and optical fiber 43. (Note that there are a number of ways to pass light into the waveguide and the directions from which the light can be introduced are not limited to normal and in-plane directions.)

The SOI structure that is depicted in FIG. 5 has advantages in microelectronic circuits due to the low dielectric capacitance and high resistance of the substrate. There are a number of known ways of fabricating SOI structures, some of which are described by B. Jalali et al. in "Advances in Silicon-on-Insulator Optoelectronics," B. Jalali et al., IEEE Journal of Selected Topics in Quantum Electronics, Vol. 4, No. 6, November/December 1998 (pp. 938–947). Two approaches that are useful for fabricating the embodiment of FIG. 4 are the bond-and-etchback SOI (BESOI) technique and the smart cut process.

According to the BESOI technique, a first silicon wafer is oxidized followed by a hydrophilic bonding of the oxide layer to the bare surface of a second silicon wafer. The first silicon wafer is then thinned and polished by mechanical and mechanical/chemical processes to the desired thickness. The optical signal circuits would be fabricated into the side of the second wafer that provides the bare surface to which the oxide layer will be bonded. The thinned first silicon wafer would then provide the substrate into which the microelectronics are later fabricated.

According to the smart cut process, an oxidized silicon wafer is implanted with hydrogen through the oxide surface layer. After that, the oxide surface is bonded to the surface of a bare silicon wafer by hydrophilic bonding. During a subsequent heat treatment the first silicon wafer splits into two parts leaving a thin silicon layer on top of the oxide layer (thereby removing much of the silicon substrate). The new exposed surface of the silicon is then polished by mechanical and chemical/mechanical methods. In this case, the optical signal circuit would be fabricated into the surface of the bare silicon wafer prior to bonding that surface to the oxide surface of the first wafer.

There are multiple ways of implementing the optical ready substrate concept other than as SOI structure. For example, an epitaxial layer can be grown on top of the silicon which contains the optical circuitry. Or the optical ready network layer can be bonded to a silicon wafer in which the microelectronic circuitry has been already fabricated and then the multiple layers of metalization interconnects can be fabricated on top of the optical layer. Or one can use a flip chip design according to which the optical network is fabricated into one chip and the microelectronic circuitry is fabricated into a second wafer and the one chip is flipped over onto the other one and bump bonds are provided for electrically interconnecting the two chips. In all of these approaches, the principle is basically the same. The optical network and the microelectronic circuits are fabricated separately and are typically located in different layers.

The Impurity-Based SiGe Detector

As noted above, this technique requires that each detector has a low absorption and be stable in its absorption over operating range so as to not significantly affect the amount of light signal reaching detectors at the end of the waveguides. An impurity-based SiGe detector, which is also characterized by a relatively weak absorption, appears to be particularly suited for use in the serial routing circuit described above. The details of the design and fabrication of the impurity-based detector are presented in co-pending patent application filed on May 29, 2003, entitled "Impurity-Based Waveguide Detectors," (AMAT Ref. #8508 US/NBD/OPTICS/JB1) and are presented in provisional patent application U.S. Ser. No. 60/474,155, entitled "Impurity-Based Waveguide Detector," filed May 29, 2003, as well as in a non-provisional application also entitled "Impurity-Based Waveguide Detectors," and filed on the same day herewith, both of which are incorporated herein by reference.

In general, in this embodiment, the impurity-based detector is a SiGe device that may take the form of an photoconductor (PIP), photodiode (PIN), or phototransistor (NpN) structure. The N- and P-regions represent highly doped electrode regions to which electrical contact to is made to the detector. The detector structures indicated above apply to a p-type impurity. For an n-type donor impurity the structure would have the opposite polarity (NIN instead of PIP, NIP instead of PIN, and PnP instead of NpN for the insulating or n-type impurity. The I or p or n-region is an impurity detector region. The p or n type impurity can be made insulating by measured co-doping with the opposite n-type donor or p-type acceptor respectively. In the impurity-based detector, the I-region is SiGe doped with a deep level state such as the p-type acceptors thallium or indium and with one or more co-implants. The acceptor dopant is characterized by producing energy states that are sufficiently far above the valence band so that a 1200–1300 nm optical signal will cause transitions of electrons from the acceptor states into the conduction band thereby detecting the optical signal. The purpose of the co-implants is to fill up with electrons the deep level holes produced by the acceptor dopant to thereby increase the detector's efficiency at detecting the optical signal and possibly to also increase the solid solubility of the indium or thallium in the SiGe lattice.

Other embodiments are within the scope of the following claims.

What is claimed is:

1. A circuit comprising:
a semiconductor substrate including a waveguide formed therein to carry an optical signal along an optical path defined by the waveguide; and
a plurality of optical detectors serially arranged in the optical path of the waveguide, each of said optical detectors being capable of detecting an optical signal passing through it and also being sufficiently transparent to said optical signal to enable said optical signal to reach and be detected by all of said plurality of detectors, wherein all of the plurality of optical detectors are designed to detect light at the same wavelength.

2. The circuit of claim 1, wherein the substrate is silicon and the waveguide is SiGe.

3. The circuit of claim 1, wherein the waveguide is serpentine in shape.

4. The circuit of claim 1, wherein the waveguide is spiral in shape.

5. The circuit of claim 1, wherein the optical signal is an optical clock signal.

6. The circuit of claim 1, further comprising a optical signal source located off of the semiconductor substrate for delivering the optical signal to the optical waveguide and an optical system for coupling the optical signal from the optical signal source into the waveguide.

7. The circuit of claim 1, further comprising a second semiconductor substrate fabricated on top of the first-mentioned semiconductor substrate, said second semiconductor substrate including semiconductor integrated microelectronic circuitry fabricated therein, wherein each of the plurality of optical detectors is electrically connected to the microelectronic circuitry in the second semiconductor substrate.

8. The circuit of claim 1, further comprising:
a second waveguide formed in the semiconductor substrate, the second waveguide defining an optical path; and
a second plurality of optical detectors serially arranged in the optical path of the second waveguide, each of said optical detectors of the second plurality of optical detectors being capable of detecting a second optical signal passing through it and sufficiently transparent to said second optical signal to enable said second optical signal to reach and be detected by all of said second plurality of optical detectors.

9. The circuit of claim 8 further comprising an optical splitter formed in the semiconductor substrate for receiving an optical input signal and splitting it into first and second optical output signals, wherein the first waveguide is coupled to said splitter to receive the first optical output signal and the second waveguide is coupled to said splitter to receive the second optical output signal.

10. The circuit of claim 1, wherein the detectors of the plurality of optical detectors are serially arranged within the waveguide.

11. The circuit of claim 8, wherein the optical detectors of the first-mentioned plurality of optical detectors are serially arranged within the first-mentioned waveguide and the optical detectors of the second plurality of optical detectors are serially arranged within the second waveguide.

12. A circuit comprising:
a first semiconductor substrate including an optical waveguide formed therein to carry an optical signal along an optical path defined by the waveguide;
a plurality of optical detectors serially arranged in the optical path of the waveguide, each of said optical detectors being capable of detecting an optical signal passing through it and also being sufficiently transparent to said optical signal to enable said optical signal to reach and be detected by all of said plurality of detectors; and
a second semiconductor substrate fabricated on top of the first-mentioned semiconductor substrate, said second semiconductor substrate including semiconductor integrated microelectronic circuitry fabricated therein, wherein each of the plurality of optical detectors is electrically connected to the microelectronic circuitry in the second semiconductor substrate.

13. The circuit of claim 12, wherein the substrate is silicon and the waveguide is SiGe.

14. The circuit of claim 12, wherein the waveguide is serpentine in shape.

15. The circuit of claim 12, wherein the waveguide is spiral in shape.

16. The circuit of claim 12, wherein the optical signal is an optical clock signal.

17. The circuit of claim 12, wherein the detectors of the plurality of optical detectors are serially arranged within the waveguide.

18. The circuit of claim 12, wherein all of the plurality of optical detectors are designed to detect light at the same wavelength.

19. The circuit of claim 12, wherein each of the plurality of optical detectors detects a different wavelength of light.

* * * * *